United States Patent
Huang

(10) Patent No.: US 11,129,258 B1
(45) Date of Patent: Sep. 21, 2021

(54) SENSING TYPE LAMP FIXTURE AND BRIGHTNESS ADJUSTMENT METHOD THEREOF

(71) Applicant: IR-TEC INTERNATIONAL LTD., Taoyuan (TW)

(72) Inventor: Wen-I Huang, Taoyuan (TW)

(73) Assignee: IR-TEC International Ltd., Taoyuan (TW)

(*) Notice: Subject to any disclaimer, the term of this patent is extended or adjusted under 35 U.S.C. 154(b) by 0 days.

(21) Appl. No.: 17/162,228

(22) Filed: Jan. 29, 2021

(51) Int. Cl.
*H05B 47/10* (2020.01)
*H05B 47/11* (2020.01)
*H05B 47/16* (2020.01)

(52) U.S. Cl.
CPC .......... *H05B 47/11* (2020.01); *H05B 47/16* (2020.01)

(58) Field of Classification Search
CPC ........ H05B 47/10; H05B 47/11; H05B 47/16; H05B 45/10
See application file for complete search history.

(56) References Cited

U.S. PATENT DOCUMENTS

2013/0187552 A1* 7/2013 Frodsham ................. H02J 7/35
                                                      315/152

* cited by examiner

*Primary Examiner* — Jimmy T Vu
(74) *Attorney, Agent, or Firm* — Rosenberg, Klein & Lee

(57) ABSTRACT

The sensing type lamp fixture executes an initialization procedure to calculate an ambient brightness value to determine whether entering the nighttime and to generate a nighttime-entering command. The sensing type lamp fixture will light up and start timing a nighttime value and automatically adjust the brightness at various adjustment times during the night. The sensing type lamp fixture will continuously detect the ambient brightness to determine whether it has entered the daytime. If not, the nighttime value will continue to be timed until entering the daytime. Then the lamp fixture will be off and stop timing the nighttime value and generate a midnight time of the next night. The sensing type lamp fixture calculates the brightness adjustment times of the next night according to the midnight time, and automatically adjusts the light-on time of the sensing type lamp fixture and automatically adjusts the brightness to save power and energy.

10 Claims, 8 Drawing Sheets

SENSING TYPE LAMP FIXTURE AND BRIGHTNESS ADJUSTMENT METHOD THEREOF

BACKGROUND OF THE INVENTION

1. Field of the Invention

The present invention is related to a lamp fixture, and in particular, to a sensing type lamp fixture and a brightness adjustment method thereof.

2. Description of the Related Art

Due to the rapid development of science and technology, the applications of lamps are prevalent, such as indoor lighting or outdoor lighting. In order to achieve the purposes of energy saving and carbon reduction, improving outdoor lighting has been continuously among the current priorities of governments' policy-making.

Nowadays, there has been an outdoor lighting fixture, which is turned on by a time-controlling switch at a turn-on-time, so that the outdoor lighting fixture emits light to achieve the lighting effect. When the turn-on-time is expired, the outdoor lighting fixture will be turned off to save electricity. However, such a control method is not so convenient since either an early or a late turning on/off will happen during summer and winter due to very different daytime and nighttime lengths which is troublesome in controlling the outdoor lightings.

Nowadays, there has been another outdoor lighting fixture, which uses an automatic on/off device to sense brightness of the daytime and nighttime and to turn off and on the outdoor lighting fixture. When the brightness is low during nighttime, the automatic on/off device will turn on the outdoor lighting fixture to make it shine, and when the brightness is high during daytime, the automatic on/off device will turn off the outdoor lighting fixture to save electricity. However, such an outdoor lighting fixture is still insufficient in saving electricity because it uses the highest brightness without automatically reducing the brightness even when there is nobody around during the night. On the long term, the energy consumption and electricity costs will be significant. Hence, there are still shortcomings in current technologies which need to be overcome.

SUMMARY OF THE INVENTION

In view of the shortcomings of the prior art, the present invention provides a sensing type lamp fixture and a brightness adjustment method thereof. The present invention automatically controls the on and off of the sensing type lamp fixture by automatically sensing the ambient brightness, and during the night, it automatically adjusts the brightness according to various time points, so as to achieve the purposes of automatically adjusting the brightness of the lighting as well as achieving energy saving.

The technical means adopted to achieve the above-mentioned objectives are to be performed by the aforementioned sensing type lamp fixture, which includes:
a lamp body;
a lighting module disposed in the lamp body and used to emit light;
a power module disposed in the lamp body, and electrically connected to the lighting module;
a brightness sensing control module disposed in the lamp body, and electrically connected with the power module to control the power module's output power so as to drive the lighting module on and off and to control the brightness thereof;
wherein the brightness sensing control module provides an initialization procedure to calculate an initial ambient brightness value to determine whether it is entering the nighttime and to generate a nighttime-entering command, the brightness sensing control module starts to time a nighttime value according to the nighttime-entering command, and controls the power module to drive the lighting module to emit light and to automatically adjust the brightness at various adjustment times during the night, when the brightness sensing control module determines that it is daytime according to the ambient brightness value, the brightness sensing control module stops timing the nighttime value, and generates a midnight time of the next night and the adjustment times of the next night.

The brightness sensing control module starts to time a nighttime value according to the nighttime-entering command, and controls the power module to drive the lighting module to light up, and the brightness sensing control module controls the power supply module to drive the lighting module to automatically adjust the brightness at various adjustment times during the night. When it enters daytime, the brightness sensing control module controls the power module to drive the lighting module off and stops timing the nighttime value, and generates a midnight time of the next night. The brightness sensing control module generates the adjustment times of the next night according to the midnight time, so that the sensing type lamp fixture can automatically adjust the brightness during the night, thereby achieving the purpose of power saving and energy saving.

Another technical approach to achieve the purpose of the present invention is to disclose a brightness adjustment method for a sensing type lamp fixture having a lamp body which includes a brightness sensing control module, a power module and a lighting module, and the power module is electrically connected to the lighting module and the brightness sensing control module, and the brightness sensing control module controls the power module to output power so as to drive the lighting module on and off and to control the brightness thereof; and the brightness adjustment method comprises the following steps after the lamp body is turned on:
performing an initialization procedure to calculate an initial ambient brightness value;
determining whether a nighttime-entering command is generated according to the initial ambient brightness value calculated by the initialization procedure;
if the nighttime-entering command is generated, starting to time a nighttime value, and the lighting module automatically adjusting the brightness at various adjustment times during the night;
detecting the ambient brightness value;
determining whether it is daytime according to the ambient brightness value; and
when it is daytime, stopping timing the nighttime value, and generating the midnight time of the next night and the adjustment times of the next night.

The above method is mainly based on the initial ambient brightness value to determine whether to generate the nighttime-entering command. When the nighttime-entering command is generated, the brightness sensing control module starts timing the nighttime value, and controls the power module to drive the lighting module to light up, and to drive the lighting module to automatically adjust the brightness at various adjustment times during the night. When the brightness sensing control module determines that it is daytime based on the ambient brightness value subsequently sensed, the brightness sensing control module stops timing the nighttime value, and generates the midnight time of the next night and the adjustment times of the next night so as to control the lighting module to automatically adjust the brightness at various adjustment times during the night, thereby achieving the purpose of power saving and energy saving.

DETAILED DESCRIPTION OF THE INVENTION

These and other aspects of the embodiments herein will be better appreciated and understood when considered in conjunction with the following description and the accompanying drawings.

Figure 1:
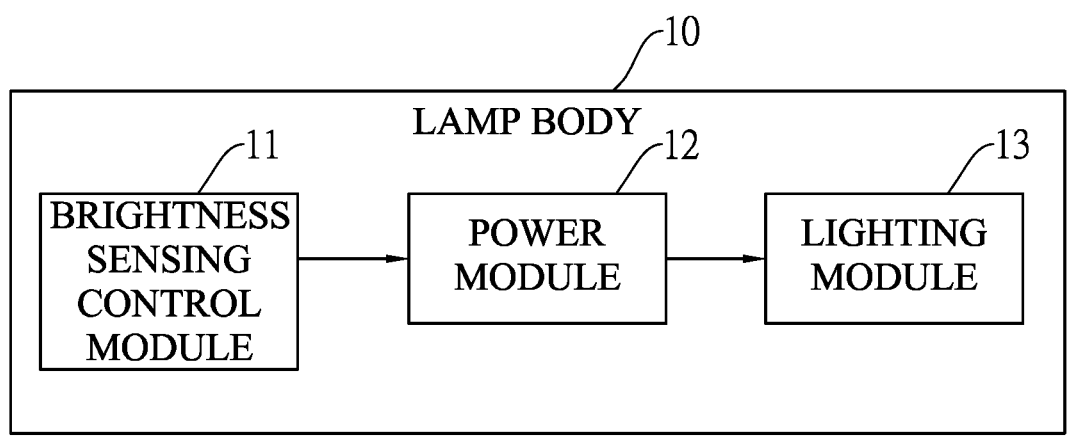
FIG. 1 is a system architecture diagram of a preferred embodiment of the present invention.
Figure 2:
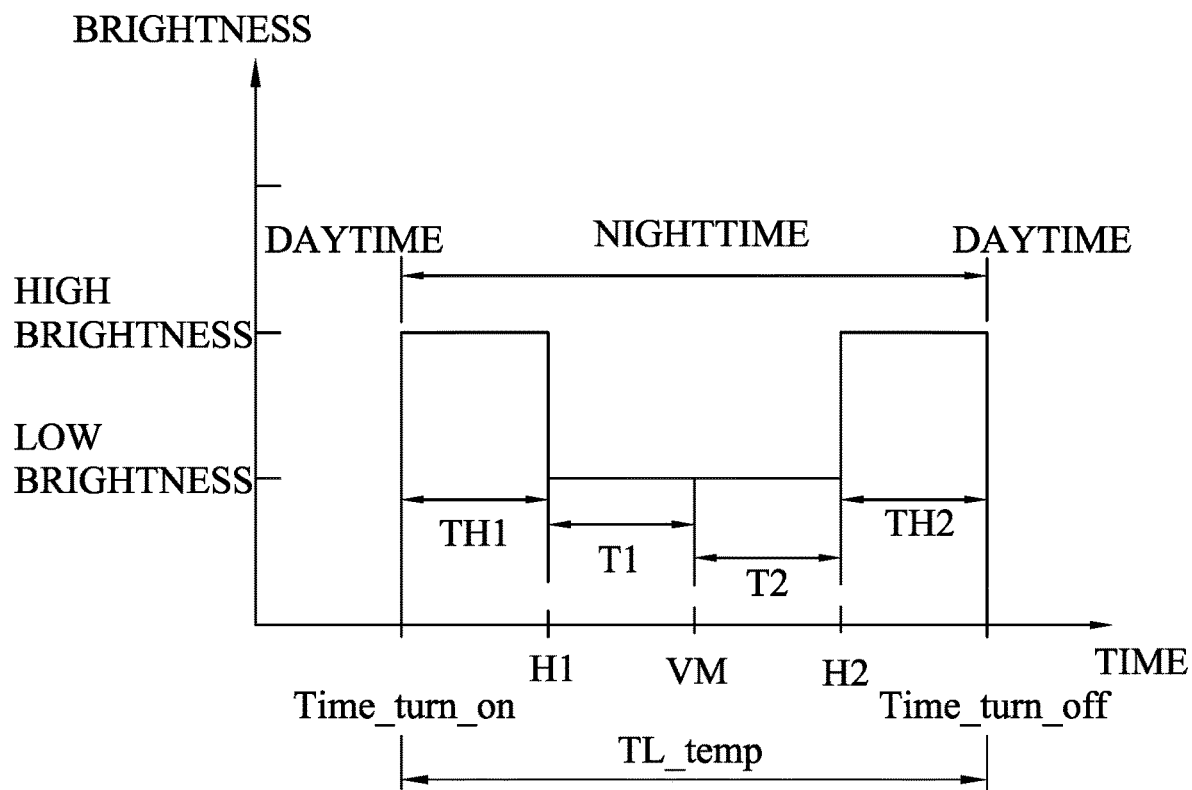
FIG. 2 is a schematic timing diagram of the preferred embodiment of the present invention.

For a preferred embodiment of the sensing type lamp fixture of the present invention, please refer to FIGS. 1 and 2, which has a lamp body 10. The lamp body 10 includes a brightness sensing control module 11, a power module 12, and a lighting module 13. The power module 12 is electrically connected to the brightness sensing control module 11 and the lighting module 13. The power module 12 is controlled by the brightness sensing control module 11 to control the on and off of the lighting module 13, and to control the brightness of the lighting module 13 with different output current values. In this embodiment, the lighting module 13 can have multiple light emitting diodes (LED). After turned on, the sensing type lamp fixture of the present invention will continue to detect the daytime and nighttime to automatically turn off and on the lighting module 13, and automatically adjust the brightness at the adjustment times during the night.

The brightness sensing control module 11 provides an initialization procedure, and executes the initialization procedure to calculate an initial ambient brightness value to determine whether entering nighttime or not, and if it is nighttime, then the brightness sensing control module 11 generates a nighttime-entering command, thereby the brightness sensing control module 11 starts to time a nighttime value TL_temp, and controls the power module 12 to drive the lighting module 13 to automatically adjust the brightness at various adjustment times during the night. The brightness sensing control module 11 detects a first ambient brightness value; when it is determined to be daytime according to the first ambient brightness value, the brightness sensing control module 11 will stop timing the nighttime value TL_temp and generate a midnight time VM, a first adjustment time H1, and a second adjustment time H2 of the next night. The nighttime value TL_temp represents a period from the time entering nighttime Time_turn_on to the time entering daytime Time_turn_off as shown in FIG. 2.

In this embodiment, when the brightness sensing control module 11 generates the nighttime-entering command, that means it is the nighttime. The brightness sensing control module 11 controls the power module 12 to turn on the lighting module 13 at high brightness until the time has reached the first adjustment time H1, then the lamp body 10 is adjusted to low brightness and continues to emit light, and when the time reaches the second adjustment time H2, the lamp body 10 is adjusted to high brightness to emit light until the brightness sensing control module 11 determines that it is daytime according to the first ambient brightness value, then the lamp body 10 will go out and complete the automatic brightness adjustments for the nighttime; in this embodiment, a preferred brightness of the high brightness is full brightness; a preferred brightness of the low brightness is one half the full brightness.

In one embodiment, from the time entering nighttime Time_turn_on to the first adjustment time H1, the lighting module 13 continuously emits light at high brightness for a first high brightness time period TH1. From entering the first adjustment time H1 to the midnight time VM, the lighting module 13 continuously emits light at low brightness for a first low brightness time period T1. From entering the midnight time VM to the second adjustment time H2, the lighting module 13 continuously emits light at low brightness for a second low brightness time period T2. From entering the second adjustment time H2 to the time entering the daytime Time_turn_off, the lighting module 13 continuously emits light at high brightness for a second high brightness time period TH2.

Figure 3:
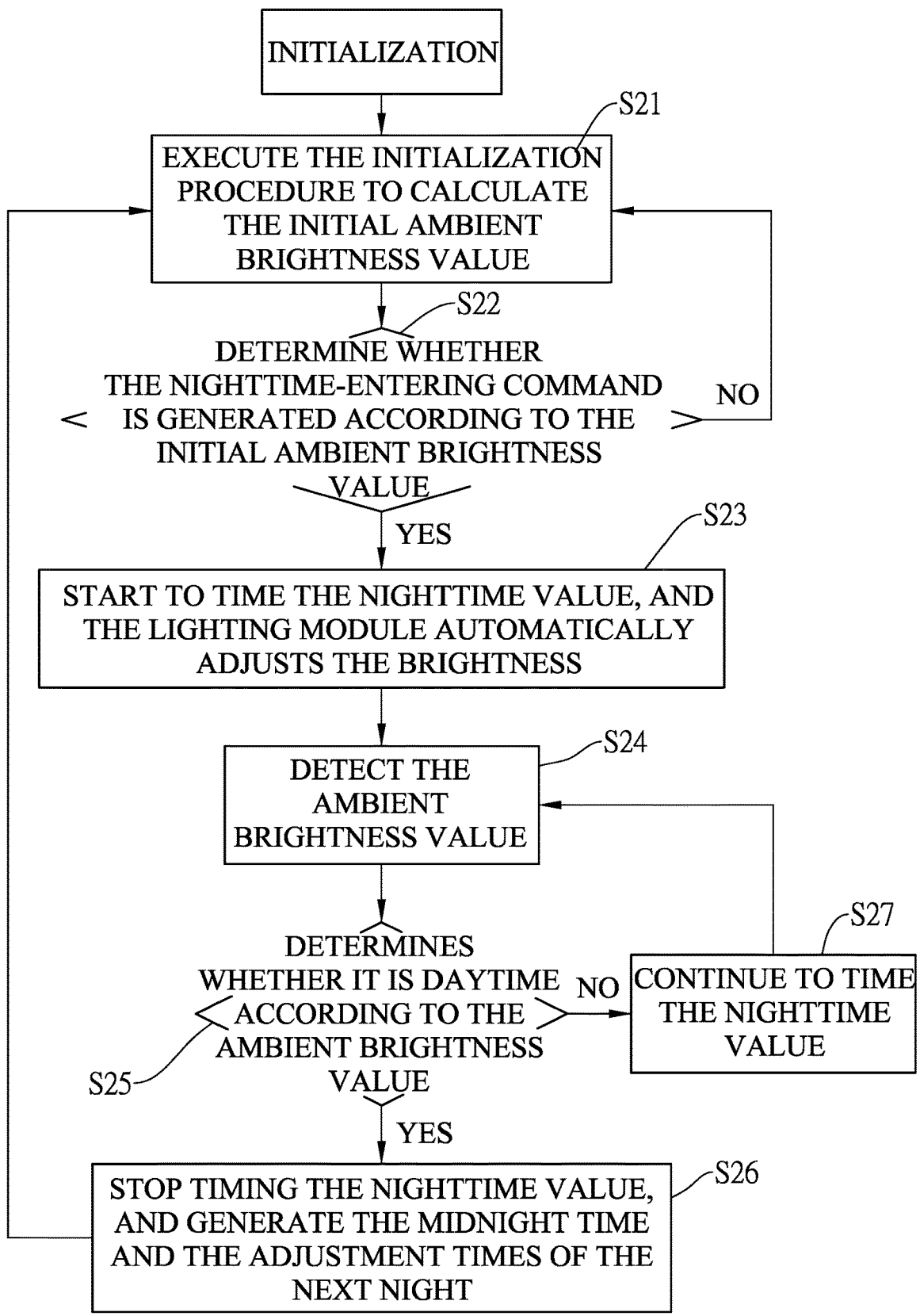
FIG. 3 is a flow chart of the architecture of the preferred embodiment of the present invention.

Based on the above description, the brightness adjustment method can be further summarized, in which a lamp body 10 is provided to execute the method, and the lamp body 10 includes a brightness sensing control module 11, a power module 12, and a lighting module 13. The power module 12 is electrically connected to the lighting module 13 and the brightness sensing control module 11. The power module 12 is controlled by the brightness sensing control module 11 so as to output electric power to drive the lighting module 13 on and off and to adjust the brightness. As shown in FIG. 3, through the lamp body 10, the brightness adjustment method performs the following steps.

The brightness sensing control module 11 executes an initialization procedure to calculate an initial ambient brightness value (S21).

According to the initial ambient brightness value calculated by the initialization procedure, the brightness sensing control module 11 determines whether a nighttime-entering command is generated (S22).

If the nighttime-entering command is generated, the brightness sensing control module 11 starts to time a nighttime value TL_temp, and controls the power module 12 to drive the lighting module 13 to automatically adjust the brightness at various adjustment times during the night (S23).

The brightness sensing control module 11 detects a first ambient brightness value (S24).

The brightness sensing control module 11 determines whether it is daytime according to the first ambient brightness value (S25).

If determining that it is daytime, the brightness sensing control module 11 stops timing the nighttime value TL_temp, and generates a midnight time VM of the next night and adjustment times of the next night (S26).

If determining that it is not daytime, the brightness sensing control module 11 continues to time the nighttime value TL_temp (S27). In this embodiment, when the brightness sensing control module 11 generates the nighttime-entering command, it means entering the nighttime, then the brightness sensing control module 11 will time the nighttime value TL_temp.

Figure 4:
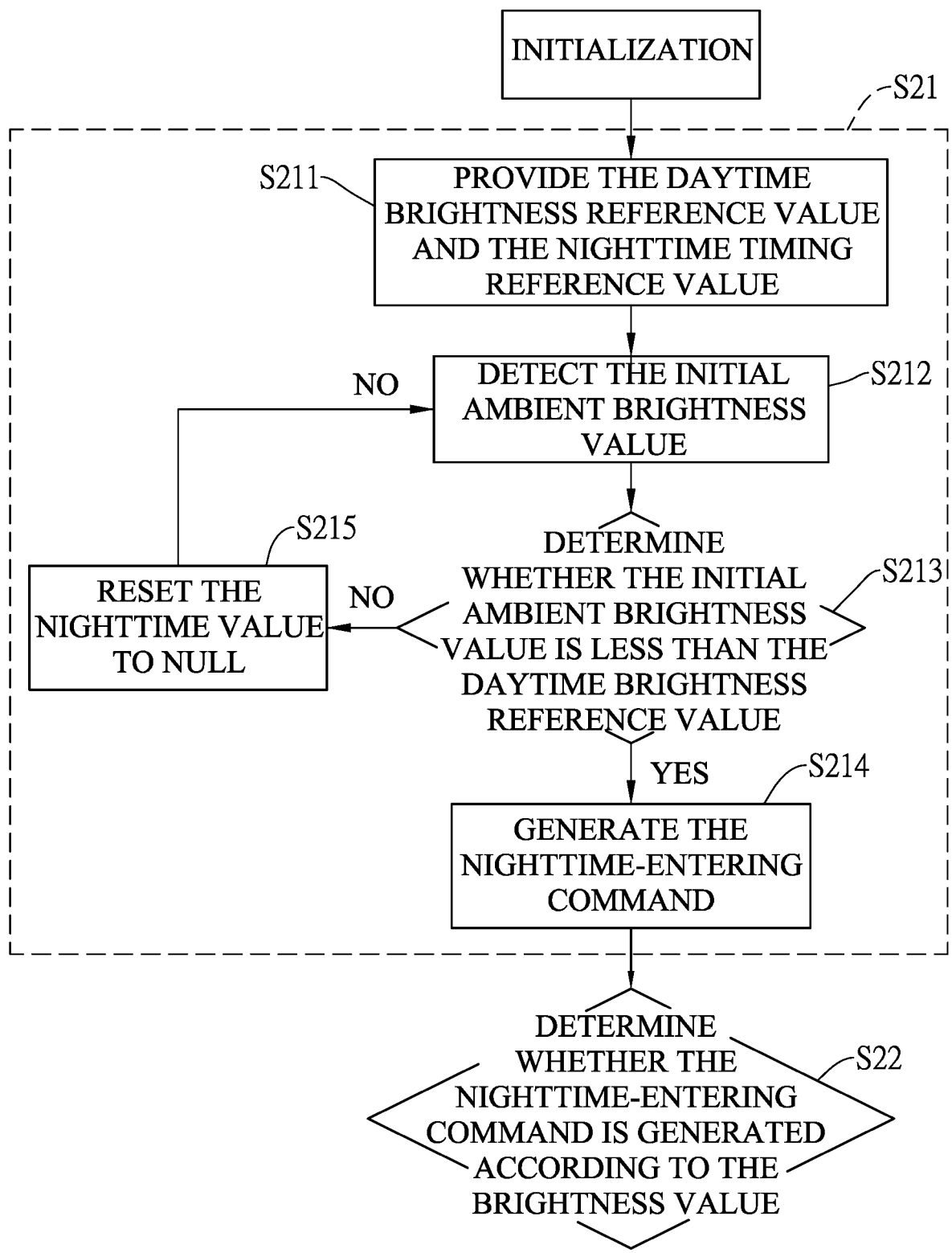
FIG. 4 is a flow chart of the initialization procedure of the preferred embodiment of the present invention.

When the brightness sensing control module 11 generates the nighttime-entering command, it means entering the nighttime, when the method proceeds to the step "the brightness sensing control module 11 executes an initialization procedure to calculate the initial ambient brightness value (S21)" as shown in FIG. 4, the method further includes the following steps:

The brightness sensing control module 11 provides a daytime brightness reference value and a nighttime timing reference value (S211).

The brightness sensing control module 11 detects the initial ambient brightness value (S212).

The brightness sensing control module 11 determines whether the initial ambient brightness value is less than the daytime brightness reference value (S213).

If the initial ambient brightness value is less than the daytime brightness reference value, the brightness sensing control module 11 generates the nighttime-entering command (S214).

If the initial ambient brightness value is not less than the daytime brightness reference value, the brightness sensing control module 11 resets the nighttime value TL_temp to null (S215).

When the brightness sensing control module 11 compares and determines the initial ambient brightness value to be less than the daytime brightness reference value, it determines entering the nighttime, and generates the nighttime-entering command; if the initial ambient brightness value is greater than the daytime brightness reference value, then it is determined that the nighttime is not entered, and the nighttime value TL_temp is nulled to avoid timing the nighttime value TL_temp during the daytime; the nighttime timing reference value is compared with the nighttime value TL_temp to determine whether the nighttime value TL_temp is normally timed.

During step (S25), when the brightness sensing control module 11 determines that the first ambient brightness value is greater than the daytime brightness reference value, it determines entering the daytime. The daytime brightness reference value and the nighttime timing reference value are set by the user, and no need to set the values again after setting, until the user resets.

Figure 5:
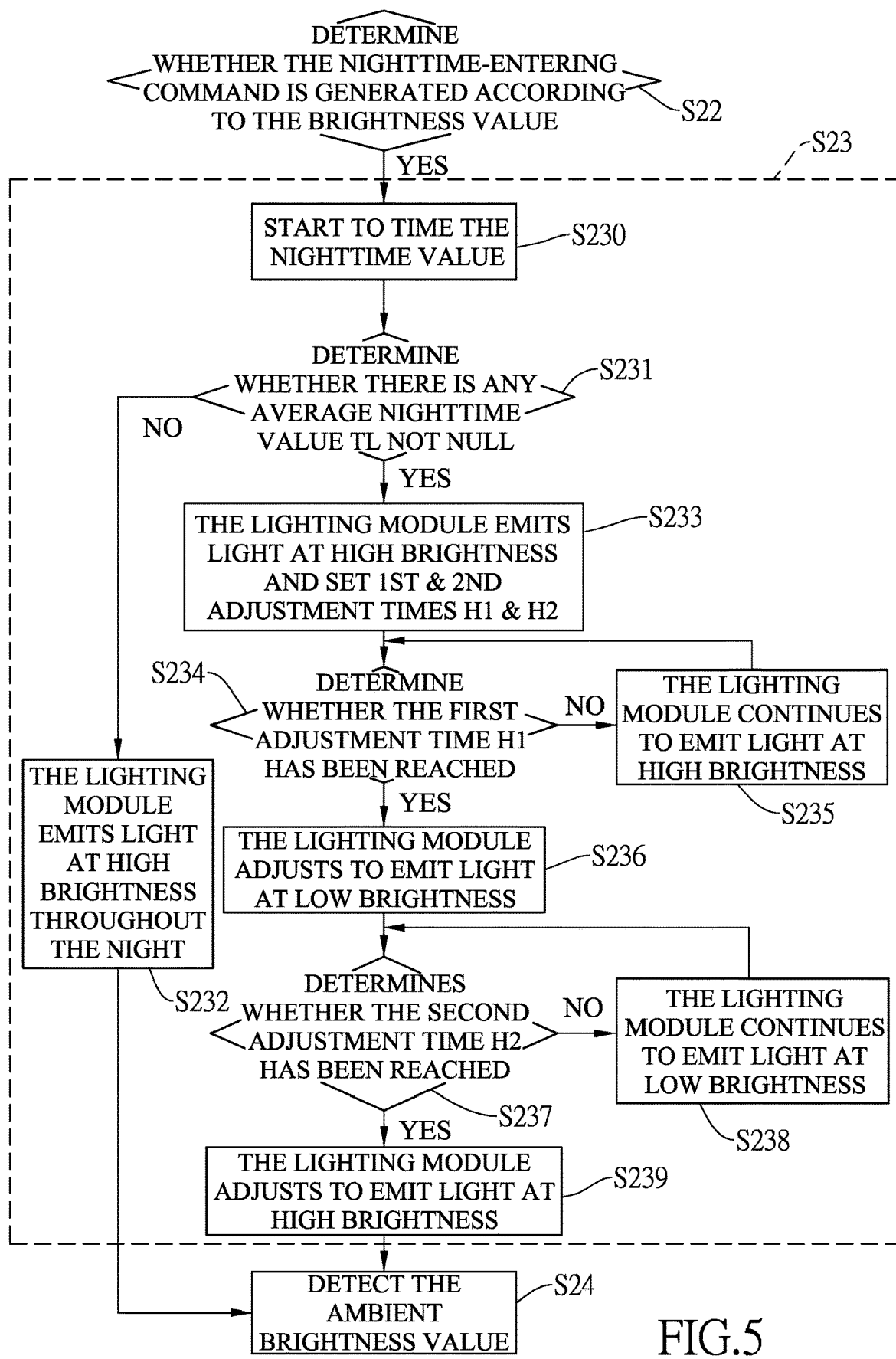
FIG. 5 is a flowchart of brightness adjustment during the night of the preferred embodiment of the present invention.

When the method proceeds to the step: "if the nighttime-entering command is generated, the brightness sensing control module 11 starts to time a nighttime value TL_temp, and controls the power module 12 to drive the lighting module 13 to automatically adjust the brightness at various adjustment times during the night (S23)", as shown in FIG. 5, the method further includes the following steps.

The brightness sensing control module 11 starts to time the nighttime value TL_temp (S230).

The brightness sensing control module 11 determines whether there is an average nighttime value TL not null (S231).

If the brightness sensing control module 11 determines that the average nighttime value TL is null, the brightness sensing control module 11 controls the power module 12 to drive the lighting module 13 to emit light at high brightness throughout the night (S232).

If the brightness sensing control module 11 determines that the average nighttime value TL is not null, the lighting module 13 emits light at high brightness, and a first adjustment time H1 and a second adjustment time H2 are set (S233).

The brightness sensing control module 11 determines whether the time has reached the first adjustment time H1 (S234).

If the brightness sensing control module 11 determines that the first adjustment time H1 has not been reached, the lighting module 13 continues to emit light at high brightness (S235).

If the brightness sensing control module 11 determines that the first adjustment time H1 has been reached, the power supply module 12 is controlled to adjust the lighting module 13 to emit light at low brightness (S236).

The brightness sensing control module 11 determines whether the time has reached the second adjustment time H2 (S237).

If the brightness sensing control module 11 determines that the second adjustment time H2 has not been reached, the lighting module 13 continues to emit light at low brightness (S238).

If the brightness sensing control module 11 determines that the time reaches the second adjustment time H2, it controls the lighting module 13 to adjust to emit light at high brightness (S239).

By determining whether the average nighttime value TL is null, it can be confirmed whether the lamp body 10 is turned on for the first time or the lamp body 10 has already been used but with abnormal timing for the nighttime value TL_temp. If the average nighttime value TL is null, the lighting module 13 emits light at high brightness throughout the night; if the average nighttime value TL is not null, it means that the lamp body 10 has been used for at least one night. The lighting module 13 automatically adjusts the brightness at the first adjustment time H1 and the second adjustment time H2, so that the lamp body 10 automatically adjusts the light-emitting brightness when there are fewer people late at night.

Figure 6:
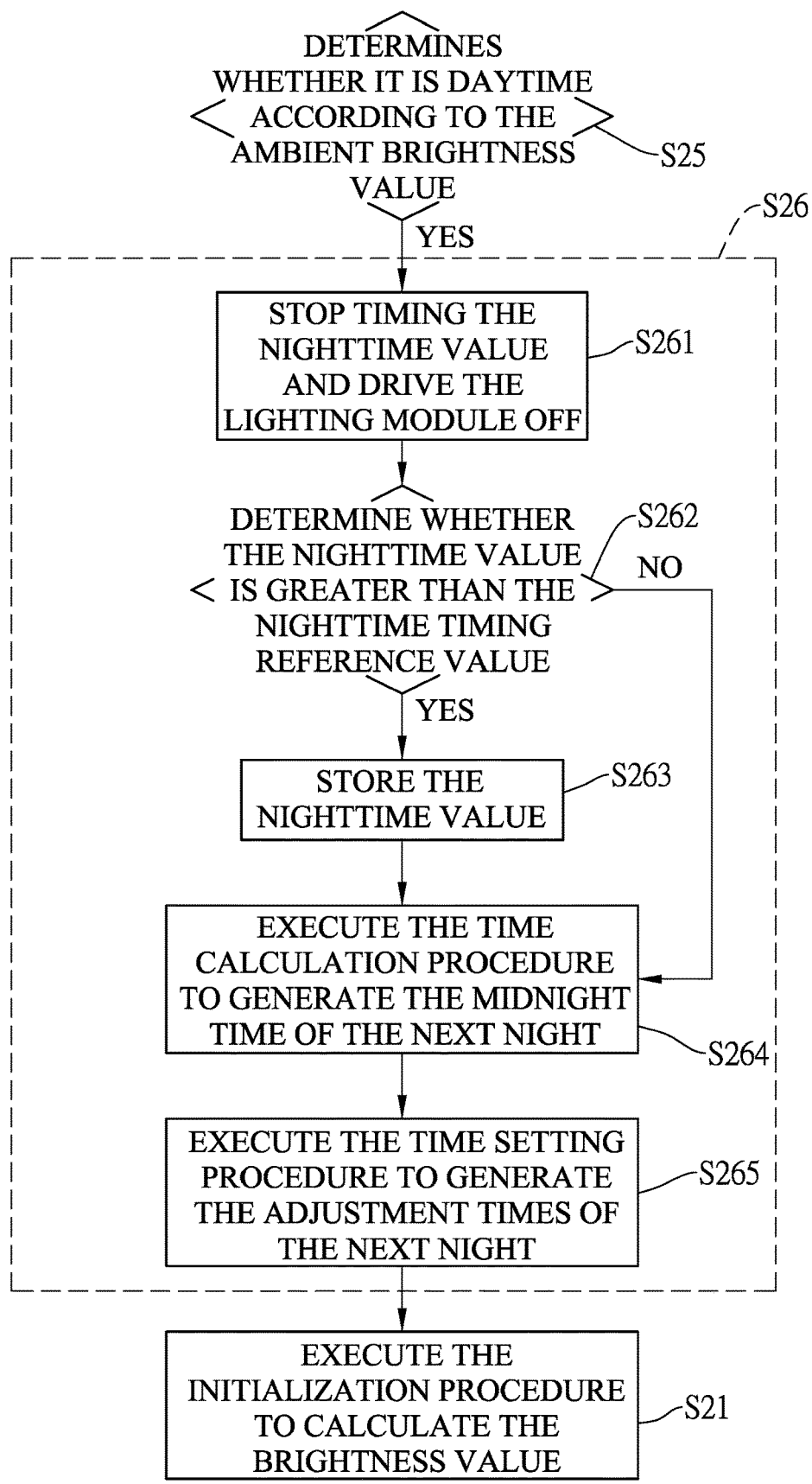
FIG. 6 is a flow chart of determining the adjustment times of the next night according to the preferred embodiment of the present invention.

Further, when the method proceeds to the step "if it is determined that it is daytime, the brightness sensing control module 11 stops timing the nighttime value TL_temp, and generates a midnight time VM of the next night and adjustment times of the next night (S26)" as shown in FIG. 6, the method further includes the following steps.

The brightness sensing control module 11 stops timing the nighttime value TL_temp, and controls the power module 12 to drive the lighting module 13 off (S261).

The brightness sensing control module 11 determines whether the nighttime value TL_temp is greater than the nighttime timing reference value (S262).

If the brightness sensing control module 11 determines that the nighttime value TL_temp is greater than the nighttime timing reference value, the nighttime value TL_temp is stored (S263).

The brightness sensing control module 11 executes a time calculation procedure to generate the midnight time VM of the next night (S264).

The brightness sensing control module 11 executes a time setting procedure to generate the first adjustment time H1 and the second adjustment time H2 of the next night (S265); in this embodiment, when the nighttime value TL_temp is greater than the nighttime timing reference value, the nighttime value TL_temp is an effective timing; when the nighttime value TL_temp is less than the nighttime timing reference value, the nighttime value TL_temp is not stored.

Figure 7:
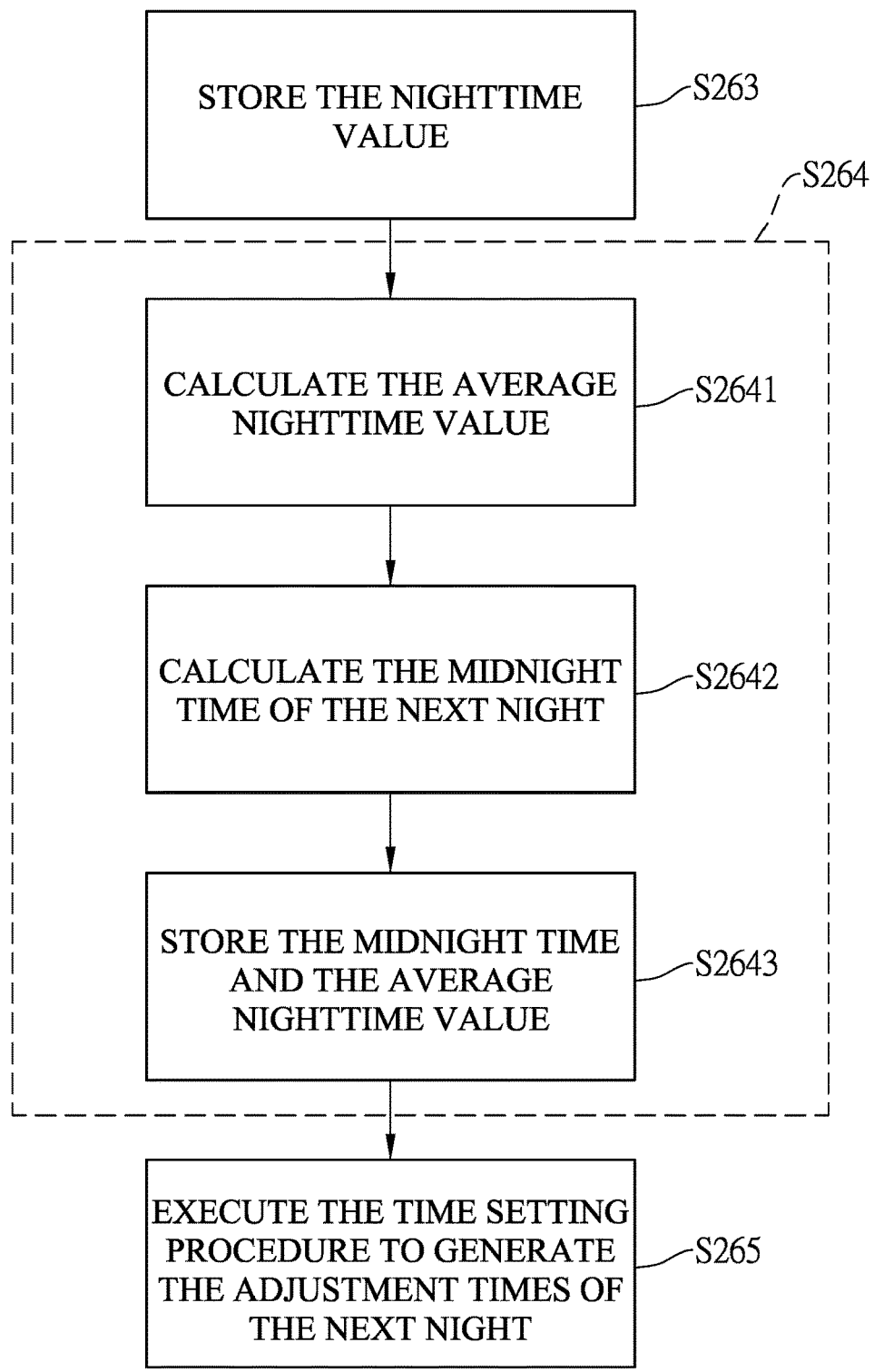
FIG. 7 is a flowchart of midnight time calculation according to the preferred embodiment of the present invention.

When the method proceeds to the step: "the brightness sensing control module 11 executes a time calculation procedure to generate the midnight time VM (S264) of the next night", as shown in FIG. 7, the method further includes the following steps.

The brightness sensing control module 11 calculates the average nighttime value TL (S2641); in this embodiment, the average nighttime value TL takes the next night as a reference, after accumulating at least one nighttime value TL_temp backwards in time, calculating an average value of the nighttime value TL_temp until the number of accumulated nighttime values TL_temp reaches a maximum number, and then subsequent calculations are based on the maximum number of nighttime values TL_temp. For example, the maximum number of nighttime values TL_temp is four (nights).

The brightness sensing control module 11 calculates the midnight time VM of the next night; in this embodiment, the midnight time VM is the central value of the average nighttime value TL, that is, the midnight time VM is equal to the average nighttime value TL divided by 2 (S2642).

The brightness sensing control module 11 stores the midnight time VM and the average nighttime value TL (S2643).

In this embodiment, if the brightness sensing control module 11 is used for the first time, the nighttime value TL_temp is null, so the average nighttime value TL is not calculated. In the second night, there is already a non-null nighttime value TL_temp of the first night, then the average nighttime value TL is calculated based on the nighttime value TL_temp of the first night, and then the midnight time VM of the second night is calculated based on the average nighttime value TL. In the fifth night, there are the nighttime values TL_temp of the previous four nights, the nighttime values TL_temp of the previous four nights can be used to calculate the average nighttime value TL, and the average nighttime value TL calculated from the previous four nights can be used to calculate the midnight time VM of the fifth night. In the sixth night, because the nighttime value TL_temp of the fifth night is not stored after being compared and determined to be smaller than the nighttime timing reference value, the average nighttime value TL of the sixth night is still calculated based on the nighttime values TL_temp of the first to the fourth nights, and then the average nighttime value TL of the sixth night can be used to calculate the midnight time VM of the sixth night. In the seventh night, the average nighttime value TL of the seventh night is calculated with the nighttime values TL_temp of the second to the fourth nights and the sixth night, and then the midnight time VM of the seventh night is calculated based on the average nighttime value TL of the seventh night, thereby correcting the midnight time value VM to avoid the daytime and nighttime length variations in the summer and the winter that cause the lighting module 13 to turn on and off at incorrect times, or to automatically adjust the brightness at incorrect times.

Figure 8:
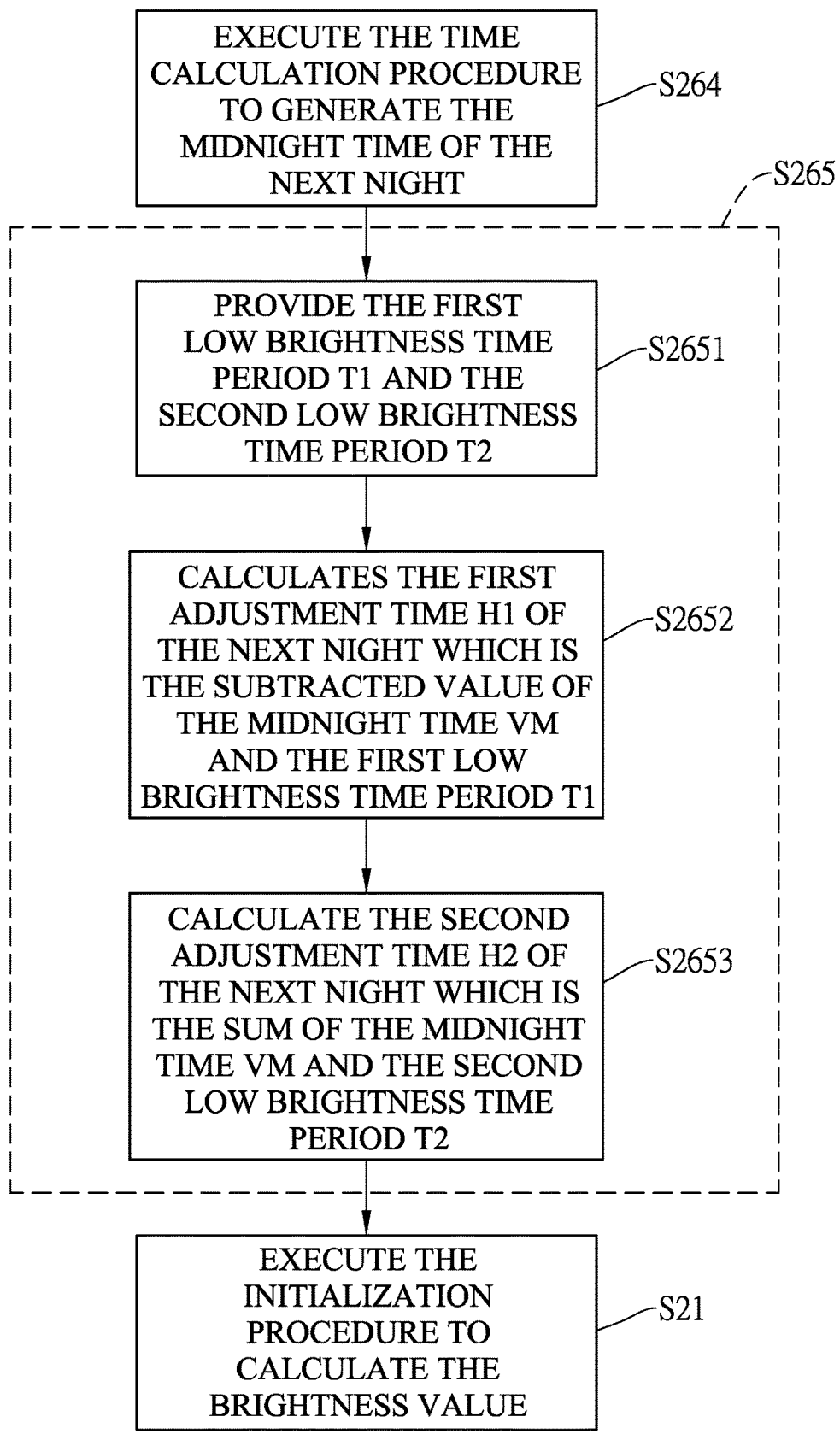
FIG. 8 is a flowchart of the adjustment time calculations according to the preferred embodiment of the present invention.

Further, when the above steps are executed to the step: "the brightness sensing control module 11 executes a time setting procedure to generate the first adjustment time H1 and the second adjustment time H2 of the next night (S265)", as shown in FIG. 8, the method further includes the following steps.

The brightness sensing control module 11 provides a first low brightness time period T1 and a second low brightness time period T2 (S2651).

The brightness sensing control module 11 calculates the first adjustment time H1 of the next night, the first adjustment time H1 is a subtracted value of the midnight time VM and the first low brightness time period T1, that is, the first adjustment time H1 is equal to the midnight time VM minus the first low brightness time period T1 (S2652).

The brightness sensing control module 11 calculates the second adjustment time H2 of the next night, the second adjustment time H2 is the sum of the midnight time VM and the second low brightness time period T2, that is, the second adjustment time H2 is equal to the midnight time VM plus the second low brightness time period T2 (S2653). In this embodiment, the midnight time VM is later than the first low brightness time period T1; the midnight time VM is earlier than the second low brightness time period T2, and the second low brightness time period T2 is less than the average nighttime value TL; the first low brightness time period T1 and the second low brightness time period T2 can be set by the user, or as built-in values of the lamp body 10, and no need to set the time again after setting, until the user resets.

In summary, in the present invention, the brightness sensing control module 11 controls the power module 12 to drive the lighting module 13, and the first adjustment time H1 and the second adjustment time H2 for the nighttime are automatically adjusted to high brightness or low brightness, so as to achieve the purpose of automatic brightness adjustment, and to calculate the average value of nighttime values TL_temp accumulated for at least one night, and the average value of nighttime values TL_temp is used in the calculation of the midnight time VM, the first adjustment time H1, and the second adjustment time H2. Thus, the present invention avoids the daytime and nighttime length variations in the summer and the winter that cause the lighting module 13 to turn on and off at incorrect times, or to automatically adjust the brightness at incorrect times, thereby achieving the purposes of energy saving and power saving, as well as automatically correcting the adjustment times.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A brightness adjustment method for controlling a sensing type lamp fixture that has a lamp body which includes a brightness sensing control module, a power module and a lighting module, wherein the power module is electrically connected with the lighting module and the brightness sensing control module, and the brightness sensing control module controls the power module to output power so as to drive the lighting module on and off and to control the brightness thereof; and the brightness adjustment method comprises the following steps after the lamp body is turned on:

performing an initialization procedure to calculate an initial ambient brightness value; determining whether a nighttime-entering command is generated, according to the initial ambient brightness value calculated by the initialization procedure;

if the nighttime-entering command is generated, starting to time a nighttime value, and the lighting module automatically adjusting the brightness at various adjustment times during the night;

detecting an ambient brightness value;

determining whether it is daytime according to the ambient brightness value; and when it is daytime, stopping timing the nighttime value, and generating the midnight time of the next night and the adjustment times of the next night.

2. The brightness adjustment method as claimed in claim 1, wherein when the step of "performing the initialization procedure to calculate the ambient brightness value" is executed, the method further includes the following steps:

the brightness sensing control module providing a daytime brightness reference value and a nighttime timing reference value;

the brightness sensing control module detecting the initial ambient brightness value;

the brightness sensing control module determining whether the initial ambient brightness value is less than the daytime brightness reference value;

when the initial ambient brightness value is less than the daytime brightness reference value, the brightness sensing control module generating the nighttime-entering command; and when the initial ambient brightness value is larger than or equal to the daytime brightness reference value, the brightness sensing control module resetting the nighttime value to null.

3. The brightness adjustment method as claimed in claim 2, wherein when the step of "starting to time a nighttime value, and the lighting module automatically adjusting the brightness at various adjustment times during the night" is executed, the method further includes the following steps:

the brightness sensing control module starting to time the nighttime value;

the brightness sensing control module determining whether there is an average nighttime value not null;

if the brightness sensing control module determines that the average nighttime value is null, the power supply module is controlled to drive the lighting module to emit light at high brightness throughout the night;

if the brightness sensing control module determines that the average nighttime value is not null, the power module is controlled to drive the lighting module to emit light at high brightness, and a first adjustment time and a second adjustment time are set;

the brightness sensing control module determining whether the time has reached the first adjustment time;

if the brightness sensing control module determines that the first adjustment time has not been reached, the lighting module continues to emit light at high brightness;

if the brightness sensing control module determines that the first adjustment time has been reached, the power supply module is controlled to drive the lighting module to emit light at low brightness;

the brightness sensing control module determines whether the second adjustment time has been reached;

if the brightness sensing control module determines that the second adjustment time has not been reached, the lighting module continues to emit light at low brightness; and if the brightness sensing control module determines that the second adjustment time has been reached, the power supply module is controlled to drive the lighting module to emit light at high brightness.

4. The brightness adjustment method as claimed in claim 3, wherein when the step of "stopping timing the nighttime value, and generating the midnight time of the next night and the adjustment times of the next night" is executed, the method further includes the following steps:

the brightness sensing control module stopping timing the nighttime value, and controlling the power module to drive the lighting module off;

the brightness sensing control module determining whether the nighttime value is greater than the nighttime timing reference value;

if the brightness sensing control module determines that the nighttime value is greater than the nighttime timing reference value, the nighttime value is stored;

the brightness sensing control module executing a time calculation procedure to generate the midnight time of the next night; and the brightness sensing control module executing a time setting procedure to generate the first adjustment time and the second adjustment time of the next night.

5. The brightness adjustment method as claimed in claim 4, wherein when the step of "the brightness sensing control module executing a time calculation procedure to generate the midnight time of the next night" is executed, the method further includes the following steps:

the brightness sensing control module calculating the average nighttime value;

the brightness sensing control module calculating the midnight time of the next night; and the brightness sensing control module storing the midnight time and the average nighttime value.

6. The brightness adjustment method as claimed in claim 5, wherein, taking the next night as a reference and after accumulating at least one nighttime value backwards in time, the average nighttime value is calculated until the number of the accumulated nighttime values reaches a maximum number, and subsequent calculations are based on the maximum number of the nighttime values; the midnight time is the central value of the average nighttime value.

7. The brightness adjustment method as claimed in claim 6, wherein when the step of "the brightness sensing control module executing a time setting procedure to generate the first adjustment time and the second adjustment time of the next night" is executed, the method further includes the following steps:

the brightness sensing control module providing a first low brightness time period and a second low brightness time period;

the brightness sensing control module calculating the first adjustment time of the next night; wherein the first adjustment time is the subtracted value of the midnight time and the first low brightness time period; and the brightness sensing control module calculating the second adjustment time of the next night; wherein the second adjustment time is the sum of the midnight time and the second low brightness time period.

8. The brightness adjustment method as claimed in claim 7, wherein the midnight time is later than the first low brightness time period; the second adjustment time is smaller than the average nighttime value.

9. A sensing type lamp fixture comprising:

a lamp body;

a lighting module disposed in the lamp body and used to emit light;

a power module disposed in the lamp body and electrically connected to the lighting module;

a brightness sensing control module disposed in the lamp body, and electrically connected with the power module to control the power module's output power so as to drive the lighting module on and off and to control the brightness thereof;

wherein the brightness sensing control module provides an initialization procedure to calculate an initial ambient brightness value to determine whether it is entering the nighttime and to generate a nighttime-entering command, and the brightness sensing control module starts to time a nighttime value according to the nighttime-entering command, and controls the power module to drive the lighting module to emit light and to automatically adjust the brightness at various adjustment times during the night, when the brightness sensing control module determines that it is daytime according to the ambient brightness value, the brightness sensing control module stops timing the nighttime value, and generates a midnight time of the next night and the adjustment times of the next night.

10. The sensing type lamp fixture as claimed in claim 9, wherein the lighting module is composed of multiple light emitting diodes.

\* \* \* \* \*